(12) United States Patent
Chiu et al.

(10) Patent No.: US 7,056,468 B2
(45) Date of Patent: Jun. 6, 2006

(54) METHOD FOR PRODUCING LOW-LOSS TUNABLE CERAMIC COMPOSITES WITH IMPROVED BREAKDOWN STRENGTHS

(75) Inventors: Luna H. Chiu, Abington, MD (US); Xubai Zhang, Ellicott City, MD (US); Louise C. Sengupta, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 188 days.

(21) Appl. No.: 10/301,981

(22) Filed: Nov. 22, 2002

(65) Prior Publication Data

US 2003/0119656 A1 Jun. 26, 2003

Related U.S. Application Data (63) Continuation-in-part of application No. 10/161,483, filed on May 31, 2002, now Pat. No. 6,905,989, and a continuation-in-part of application No. 09/768,690, filed on Jan. 24, 2001, now Pat. No. 6,774,077, and a continuation-in-part of application No. 09/594,837, filed on Jun. 15, 2000, now Pat. No. 6,514,895.

(51) Int. Cl.
*C04B 33/32* (2006.01)

(52) U.S. Cl. .................................... 264/650
(58) Field of Classification Search ............... 264/650
See application file for complete search history.

(56) References Cited

U.S. PATENT DOCUMENTS

| | | | |
|---|---|---|---|
| 4,643,984 A | 2/1987 | Abe et al. | 501/134 |
| 4,968,649 A | 11/1990 | Tsurumi et al. | 501/134 |
| 5,096,642 A | 3/1992 | Shirasaki | 264/66 |
| 5,114,642 A | 5/1992 | Jung | 264/61 |
| 5,202,153 A | 4/1993 | Siuta | 427/125 |
| 5,204,055 A | 4/1993 | Sachs et al. | 419/2 |
| 5,312,790 A | 5/1994 | Sengupta et al. | 501/137 |
| 5,427,988 A | 6/1995 | Sengupta et al. | 501/137 |
| 5,453,262 A | 9/1995 | Dawson et al. | 423/593 |
| 5,486,491 A | 1/1996 | Sengupta et al. | 501/137 |
| 5,578,257 A | 11/1996 | Van de Sype | 264/40.1 |
| 5,593,526 A | 1/1997 | Yokouchi et al. | 156/89 |
| 5,635,433 A | 6/1997 | Sengupta | 501/137 |
| 5,635,434 A | 6/1997 | Sengupta | 501/138 |
| 5,672,378 A | 9/1997 | Maher et al. | 427/123 |
| 5,693,429 A | 12/1997 | Sengupta et al. | 428/699 |
| 5,766,697 A | 6/1998 | Sengupta et al. | 427/585 |
| 5,830,591 A | 11/1998 | Sengupta et al. | 428/701 |
| 5,846,893 A | 12/1998 | Sengupta et al. | 501/137 |
| 5,868,884 A | 2/1999 | Oiwa et al. | 156/89.16 |
| 5,880,924 A * | 3/1999 | Kumar et al. | 361/234 |
| 5,908,802 A | 6/1999 | Voigt et al. | 501/134 |
| 5,948,193 A | 9/1999 | Cohn et al. | 156/89.16 |
| 6,074,971 A | 6/2000 | Chiu et al. | 501/139 |
| 2004/0071944 A1* | 4/2004 | Weir et al. | 428/209 |

OTHER PUBLICATIONS

R.W. Babbitt et al. "Planar Microwave Electro-Optic Phase Shifters", Microwave Journal, Jun. 1992, pp. 63-79.

* cited by examiner

*Primary Examiner*—Sean Vincent
(74) *Attorney, Agent, or Firm*—Alan Towner; Donald D. Mondul; James S. Finn (57) ABSTRACT

The production of low-loss, tunable composite ceramic materials with improved breakdown strengths is disclosed. The composite materials comprise ferroelectric perovskites such as barium strontium titanate or other ferroelectric perovskites combined with other phases such as low-loss silicate materials and/or other low-loss oxides. The composite materials are produced in sheet or tape form by methods such as tape casting. The composite tapes exhibit favorable tunability, low loss and tailorable dielectric properties, and can be used in various microwave devices.

20 Claims, 8 Drawing Sheets

(a) Bulk material

FIG. 6a (b) Tape-cast material

METHOD FOR PRODUCING LOW-LOSS TUNABLE CERAMIC COMPOSITES WITH IMPROVED BREAKDOWN STRENGTHS

CROSS REFERENCE TO RELATED APPLICATIONS

This application is a continuation-in-part of U.S. application Ser. No. 09/594,837 filed Jun. 15, 2000, now U.S. Pat. No. 6,514,895, U.S. application Ser. No. 09/768,690 filed Jan. 24, 2001, now U.S. Pat. No. 6,774,077, and U.S. application Ser. No. 10/161,483 filed May 31, 2002, now U.S. Pat. No. 6,905,989, all of which are incorporated herein by reference.

FIELD OF THE INVENTION

The present invention relates to low loss, electronically tunable ceramic materials, and more particularly relates to a method for making sheets or tapes of such materials with improved breakdown strengths by processes such as tape casting.

BACKGROUND INFORMATION

Microwave devices such as electronically scanning antennas, phased array antennas, electronic down tilt antennas, electronically tunable filters, electronically tunable radar and tunable oscillators have been proposed for use, but their high costs have prevented widespread commercial implementation. The existence of low cost tuning technology would revolutionize the industry of microwave components and antennas.

Tuning refers to the ability to change the dielectric constant of a material. This translates in the microwave component field as the ability to use the same component and change the frequency of operation by changing the input voltage or current. It can allow for a single filter to frequency-hop during operation. For antennas, being able to tune using low cost technology would create a new class of phased array antennas, which could be used in common households instead of being limited to large, expensive systems. Phased array antennas can be described as electronically scanning antennas. By using electronically scanning antennas, satellite communications can be available in many situations, because the antennas would allow for tracking of a satellite. This means voice and data communications can be done in a mobile arena. Also, mobile communications would be available at a global level without the need for major infrastructure.

Phased array antennas comprise a large number of elements that emit phased signals to form a radio beam. The radio signal can be electronically steered by the active manipulation of the relative phasing of the individual antenna elements. This electronic beam steering concept applies to both the transmitter and the receiver. Phased array antennas are advantageous in comparison to their mechanical counterparts with respect to their speed, accuracy and reliability. For example, the replacement of gimbal mounted mechanical antennas by phased array antennas increases survivability through more rapid and accurate target identification. Complex tracking exercises can therefore be performed rapidly and accurately with a phased array antenna system.

Future communications will also require wideband communications using frequency-hopping techniques, so that large amounts of digital data can be transferred over the band. A critical component for these applications is a low cost, fast acting tunable filter. Digital data could be distributed or encoded over a band of frequencies in a sequence determined by control circuitry of the tunable filter. This would allow for several users to transmit and receive over a common range of frequencies.

Technologies for scanning that could possibly be adapted for phase shifter applications are semiconductor diode phase shifters and ferrite phase shifters. Conventional diode phase shifters are expensive because they require active electronic circuits to be added to designs in order to compensate for their high loss at microwave frequencies. They do not have good power handling characteristics. When power is put through the diodes, they start to behave in a very non-linear fashion, or they break down. Diodes also require holding power in order to maintain accuracy, as well as power during switching.

Although ferrites are currently the most widely used type of phase shifter materials, they are mostly limited to military applications. The major reason for this is that they are very expensive to manufacture. Secondary reasons include the fact that they are not designed to work in a broadband situation. When the frequency changes, a new set of materials has to be designed and manufactured. They are also very bulky in size and heavy. Furthermore, such phase shifters are difficult or impossible to make in a planar configuration. Conventional ferrites are also driven by high power due to the fact that they activate based on current.

Barium titanate is a known ceramic material that is tunable at room temperature. Another known tunable ceramic is strontium titanate. However, this material by itself must be super cooled in order to have usable tuning characteristics. Other tunable dielectrics include lead zirconium titanates (PZT), lead lanthanum zirconium titanates (PLZT), $PbTiO_3$, $KNbO_3$, $LaTaO_3$, $BaCaZrTiO_3$, $NaNO_3$ and other ferroelectric perovskites. The problem with these known ferroelectrics is that their losses are very high at room temperature. This makes these materials essentially useless at microwave frequencies. One way to combat this problem would be to produce a low loss but still tunable composite material with reasonable dielectric constants.

Barium strontium titanate (BSTO) has been used for its high dielectric constant, on the order of 200 to 6,000, and its large change in dielectric constant with applied voltage, on the order of 25 to 75 percent at a field of 2V/micron. Some ferroelectric composite materials which include BSTO are disclosed in U.S. Pat. No. 5,427,988 to Sengupta et al. entitled "Ceramic Ferroelectric Composite Material BSTO—MgO"; U.S. Pat. No. 5,645,434 to Sengupta et al. entitled "Ceramic Ferroelectric Composite Material BSTO—Magnesium Based Compound"; U.S. Pat. No. 6,074,971 to Chiu et al. entitled "Ceramic Ferroelectric Composite Materials with Enhanced Electronic Properties BSTO—Mg Based Compound—Rare Earth Oxide"; U.S. patent application Ser. No. 09/594,837 to Chiu et al. filed Jun. 15, 2000 entitled "Electronically Tunable Ceramic Materials Including Tunable Dielectric and Metal Silicate Phases"; and U.S. patent application Ser. No. 09/768,690 to Sengupta et al. filed Jan. 24, 2001 entitled "Electronically Tunable, Low-Loss Ceramic Materials Including a Tunable Dielectric Phase and Multiple Metal Oxide Phases", each of which is incorporated herein by reference.

Multilayered ferroelectric composite devices are disclosed in U.S. Pat. No. 5,693,429 to Sengupta et al. entitled "Electronically Graded Multilayered Ferroelectric Composites"; and U.S. Pat. No. 5,830,591 to Sengupta et al. entitled "Multilayered Ferroelectric Composite Waveguides", which are incorporated herein by reference.

The idea of a voltage tunable dielectric has been proposed for use in antenna applications in a paper entitled "Planar Microwave Electro-Optic Phase Shifters", Microwave Journal, Volume 35 (6), June 1992. There is a need for new materials which have desirable electronic properties in order to make this possible. As with most ferroelectrics which are tunable at room temperature, the losses at frequencies above 600 MHz become too high to use cost effectively. Also, high dielectric constants make it virtually impossible to integrate and match them to RF circuits. This causes increased insertion losses.

The present invention has been developed in view of the foregoing, and to address other deficiencies of the prior art.

SUMMARY OF THE INVENTION

The present invention provides a method for making sheets or tapes of low-loss tunable ceramic composite materials for use in voltage tunable RF devices such as phase shifters, tunable capacitors, delay lines and the like. The composite materials have improved breakdown strengths, and are made by techniques such as tape casting.

In accordance with an embodiment of the present invention, tunable ceramic properties are combined with the advantages of tape casting in order to produce microwave devices with improved properties. The tape casting method may produce thin tapes (e.g., 0.005 mm to 0.025 mm), intermediate tapes (e.g., 0.025 mm to 0.5 mm) and thick tapes (e.g., 0.5 mm to 2 mm). The improved properties of the fired tape in comparison with bulk material of the same composition may include improved breakdown strength, increased density, improved homogeneity, decreased grain size, enhanced voltage handling, smoother surface and the ability to produce near net shape products. Furthermore, by using the tape casting method for manufacturing, low cost production of many types of antennas and other RF structures may be achieved.

An aspect of the present invention is to provide a method of making a layer of low-loss, tunable ceramic composite material having improved breakdown strength. The method includes the steps of tape casting a slurry comprising a mixture of at least one tunable ceramic material and at least one additional ceramic material, and sintering the tape cast material to form a sintered tape cast layer.

Another aspect of the present invention is to provide a tape cast, low-loss, tunable ceramic composite layer having improved breakdown strength. The layer comprises a sintered mixture of at least one tunable ceramic material and at least one additional ceramic material.

A further aspect of the present invention is to provide a multilayer laminated material having improved breakdown strength in which at least one of the layers comprises a tape cast, low-loss, tunable ceramic composite material.

These and other aspects of the present invention will be more apparent from the following description.

DETAILED DESCRIPTION

The present invention provides low-loss, tunable ceramic composite materials in tape form. The tapes may have thicknesses of from about 0.005 to about 2 mm. In one embodiment, the tape is relatively thin, e.g., from 0.005 to 0.025 mm. In another embodiment, the tape has an intermediate thickness, e.g., from 0.025 to 0.5 mm. In a further embodiment the tape is relatively thick, e.g., from 0.5 to 2 mm. The tapes exhibit favorable properties such as low loss, high tunability and improved breakdown strength.

As used herein, the term "loss" means microwave energy dissipation. The term "tunable" means the ability of a material to change its dielectric constant with applied electrical field. The term "breakdown strength" means the maximum voltage achievable before leakage or catastrophic failure occurs. The term "improved breakdown strength" means that the breakdown strength of the present tape material is substantially higher than the breakdown strength of the same material produced by standard bulk processing techniques, e.g., the maximum voltage achievable before leakage of catastrophic failure occurs is at least 10 percent or 20 percent higher for the present tape material compared with the bulk-processed material.

The dielectric constant or permittivity of at material is a complex quantity defined as $\in = \in' - i\in$. It is a measure of the amount of charge that can be stored in a material. In general for most applications dielectric constants should be in the range of 10 to 1,500. A lower dielectric constant may be preferable for waveguides so that impedance matching is easier. However, in some co-planar devices such as varactors or delay lines, higher dielectric constant materials yield reasonable sizes for lines and spacings.

The loss tangent is a measure of the dissipation of microwave energy in a device and can be defined as $\in''/\in'$. A low loss tangent is typically the desirable characteristic. Depending on the frequency of an application, usable loss tangents are typically below 0.04. Preferably, the loss tangents of the present tape materials are less than 0.025. If low loss tangent at high microwave frequencies can be achieved, there is no need for active amplification of signals, and the cost and complexity of a particular device may be significantly reduced.

The tunability of a material is a measure of how much the dielectric constant changes with applied voltage. High tunability is desirable for most applications. For example, in the case of waveguides, higher tunability will allow for shorter pieces which results in a lower insertion loss in the overall device. Higher tunability will result in a large angle of sweep at lower operation voltages. The tunability can be calculated as follows: % tunability=$[(X-Y)/(X)] \times 100$ where X is the dielectric constant at zero voltage and Y is the dielectric constant at a specific applied voltage. The tape materials of the present invention typically have tunabilities of at least 15 percent, preferably at least 25 percent.

As used herein, the term "tape casting" refers to a method for producing a thin layer of a ceramic slip or slurry on a carrier, such as a Mylar sheet, a stainless steel sheet, rollers or the like. The tape casting slurry may comprise, for example, ceramic powder, a polymeric binder system, and a liquid which can be solvent or aqueous based. The slurry may be poured or pumped into a reservoir, and the slurry may be carried from the reservoir by a moving belt carrier system across a doctor blade set to a particular height. By changing the height of the doctor blade, different thicknesses of tape can be cast. The liquid phase may be removed from the tape, leaving a thin flexible ceramic contained in a polymer binder system. The present process may be used to make electronic substrates. In addition, the process may be used to make very thin (e.g., less than 1 mil) dielectric layers in a multilayer capacitor or the like.

One type of tape casting method that may be used to produce tapes of the present materials is a roll compaction method. Instead of being formed by a doctor blade, the slurry is passed under several rollers set a particular distance apart. The solvent or water content of the slurry used in the roll compaction process may be significantly less than in other tape casting processes, resulting in decreased drying times.

The tape casting method can be used to form thin layers (e.g., from about 5 microns to 50 microns) of tunable dielectric materials and thicker layers of tunable dielectric materials (e.g., greater than 50, 100 or 200 microns). The tunable dielectric materials may comprise composite or doped composite ceramic materials, usually ferroelectric perovskites, which exhibit the property of tuning.

The present tape casting method provides a sheet or tape of ceramic material using a ceramic slip or slurry and a mechanism for forming the slip such as a doctor blade, a slit or rollers. The tape cast material may be formed into a continuous length of material. The slip may be carried past the mechanical forming apparatus, for example, by a conveyor belt or a moving carrier such as a Mylar sheet. Once the slurry is made, a doctor blade may be run over the slurry in order to achieve the desired thickness. Alternatively, knife coating and roll compaction techniques may be used.

In a preferred embodiment, the tape casting operation is a continuous process that is scalable. For example, material may be fed in one end and tapes may be rolled up onto take-up reels at the other end of a continuous manufacturing line. Due to the continuous nature of the process and the ease of producing intricate parts such as multi-layer tunable ceramics, the cost of production is inexpensive compared to conventional bulk processing methods. Usually, there are less processing steps involved, decreased labor, and time to production of producing many parts is less. The cost of processing can therefore be significantly less for many types of components.

Figure 1:
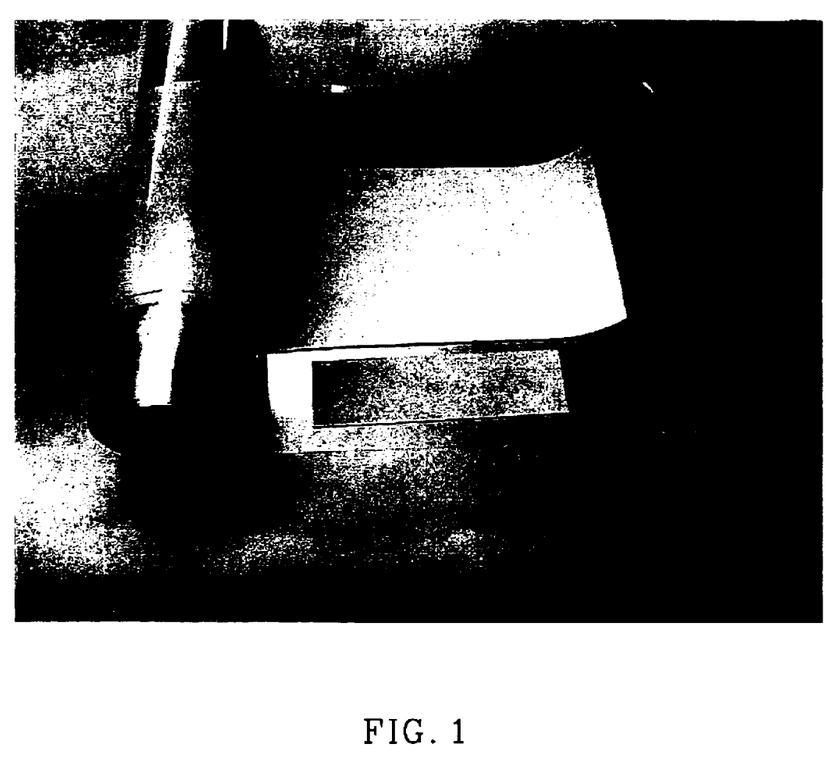
FIG. 1 is a photograph of a green tape of a ceramic material having a thickness of 40 mils, and a sintered sheet of the material having a thickness of 25 mils.

A typical tape cast piece of tunable ceramic is shown in FIG. 1. The green tape cast ceramic has a thickness of about 40 mils (1.0 mm), while the sintered tape cast ceramic has a thickness of about 25 mils (0.64 mm). The green tape shown in FIG. 1 comprises about 65 weight percent of the ceramic material, about 5 weight percent of a PVB binder, and the rest plasticizers and solvents.

Figure 2A:
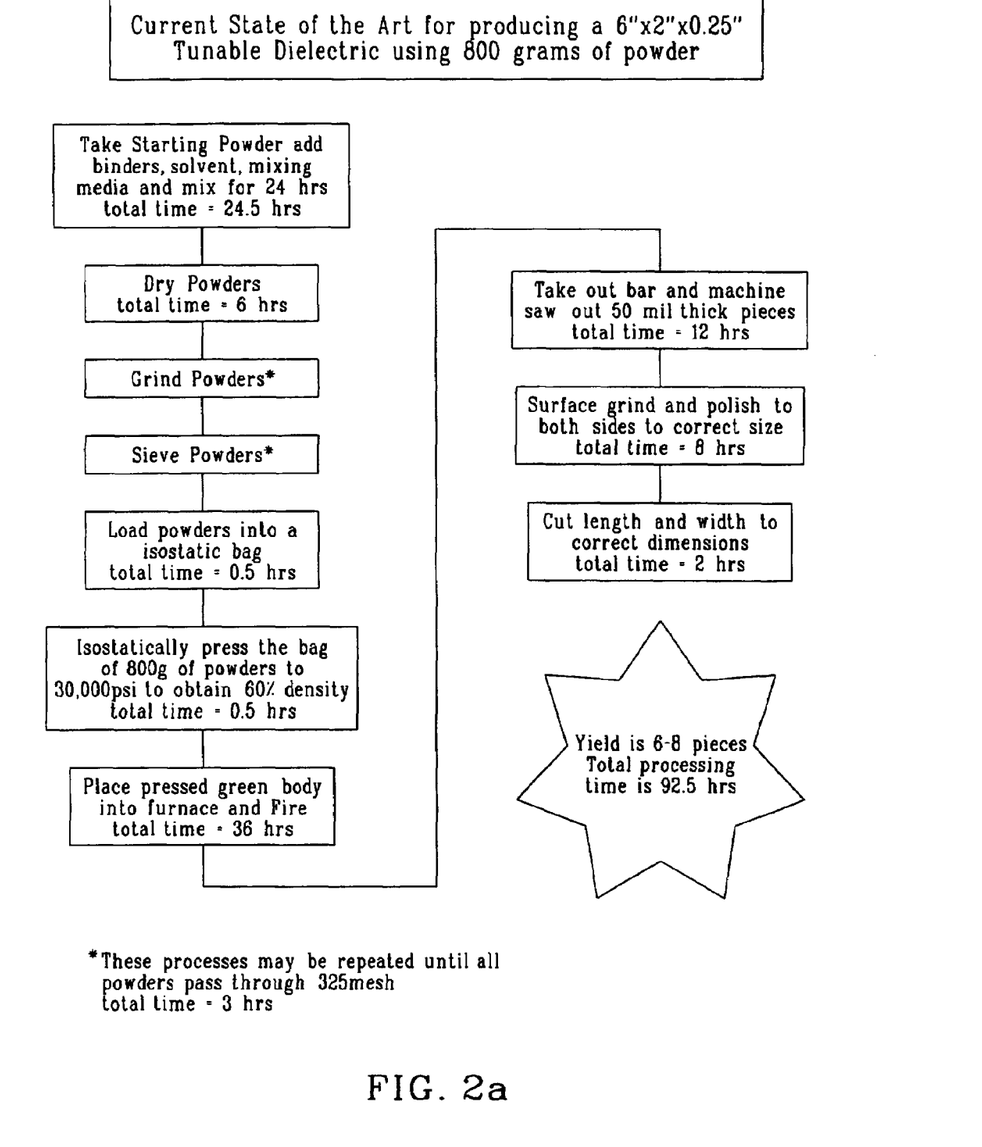
FIGS. 2a and 2b are comparison flow charts for the production of a flat plate using conventional ceramic processing methodology and the present tape casting method, respectively.
Figure 2B:
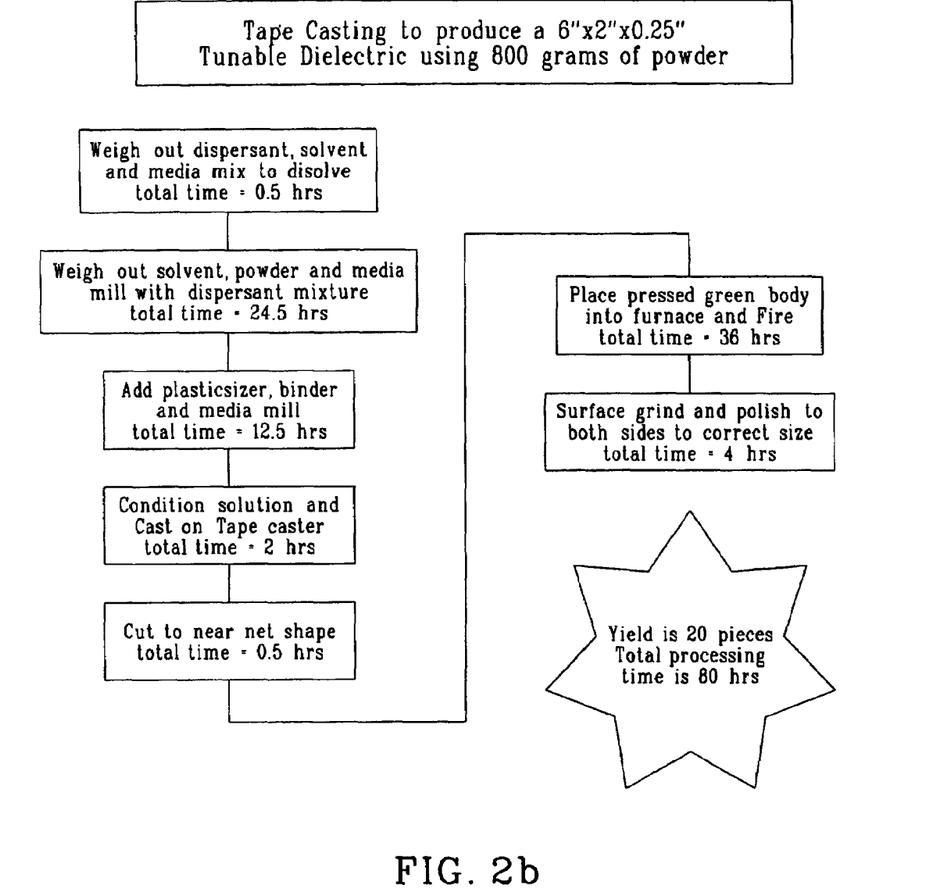

FIGS. 2a and 2b illustrate a standard bulk ceramic process and a tape casting process of the present invention, respectively. As can be seen from FIGS. 2a and 2b, the bulk and tape casting processing steps are different. However, the time involved to make a larger number of pieces is substantially less with tape casting. The tape casting method is preferred for producing flat parts. In accordance with the present invention, tape casting may be used to produce substrates, plates, tiles and thick films of tunable dielectrics. Due to the ease of producing large quantities of parts, tape casting is a cost effective method for producing tunable ceramic substrates.

The steps required for producing a tape cast tunable material are outlined in FIG. 2b. The initial step is to start with the formulation of the tunable composite material. The next step is to formulate the ceramic slurry. The next step is the actual casting of the tape. Finally, the tape is cut, punched and fired.

In one embodiment, powder of tunable material such as $BaSrTiO_3$ can be mixed with a second phase ceramic powder. The tunable phase may be selected from many types of ferroelectric compounds or doped ferroelectric compounds, such as $BaSrTiO_3$, $BaTiO_3$, $PbTiO_3$, $KNbO_3$, $LiNbO_3$, $PbNb_2O_6$, $PbTa_2O_6$, $KSr_2(NbO_3)_5$, $NaBa_2(NbO_3)_5$, $Gd_2(MoO_4)_3$, $KD_2PO_4$, $(NH_4)_2SO_4$, $NaNO_2$, $KNO_2$ and the like. The non-tunable second phase may comprise low loss ceramic oxides, silicates, titanates, zirconates, aluminates or glasses. The percentages of tuning to non-tuning material can be anywhere from about 1 weight percent to about 99 weight percent.

In addition to $Ba_xSr_{1-x}TiO_3$, other ferroelectric perovskites can be used as the tunable phase. An example is a structure of the form $Ba_xCa_{1-x}TiO_3$. A solid solution of other tunable ferroelectrics as the base material may also be used in accordance with the present invention. Therefore, other tunable ferroelectrics may be used as a modification, such as $BaTiO_3$, $PbTiO_3$, $KNbO_3$, $LiNbO_3$, $PbNb_2O_6$, $PbTa_2O_6$, $KSr_2(NbO_3)_5$, $NaBa_2(NbO_3)5$, $Gd_2(MoO_4)_3$, $KD_2PO_4$, $(NH_4)_2SO_4$, $NaNO_2$, $KNO_2$ and the like In the case of the second phase, a metallic silicate $(M_xSi_yO_z)$ may be used. Examples of metallic silicates include $Mg_2SiO_4$, $CaSiO_3$, $BaSiO_3$, $SrSiO_3$, $Al_2Si_2O_7$, $LiAlSiO_4$, sodium silicates and other salt silicates.

Metallic oxides $(M_xO_y)$ may also be used as the second phase. Examples of metallic oxides include MgO, CaO, SrO, $BaO_2$, $MnO_2$, $TiO_2$, $ZrO_2$, $Nb_2O_5$, $Ta_2O_5$, WO, ZnO, $Al_2O_3$, rare earth oxides, other zirconates, niobates, tantalates, aluminates, stannates, titanates and the like.

The powders may be ball-milled, for example, in a liquid solvent, deionized water or dry mixed with ceramic grinding media. Other mixing methods such as high speed mixing, spray drying and shear mixing can be used to mix the starting powders. In the case of wet mixing, the powders are then allowed to dry. The powders may or may not undergo a calcining step to form the correct composition. During the mixing step, dispersants may optionally be added. The composite powder may be dried and ground to a workable particle size. At this point, the powder may be made into a slurry. It is also possible to eliminate some of the processing steps by mixing and dispersing the powder in the solvent system for the slurry.

The tape slurry may be made by adding the composite powder to a dispersant and solvent mixture. Mixing media may be added to the container to enhance the mixing process. A liquid solvent may be used to suspend the powder. The solvent may be any suitable organic solvents or aqueous solvents or combinations of solvents. Suitable solvents include ethanol, methanol toluene, MEK, xylenes and water. The type of dispersants and surfactants used depend on the composite powder. In many cases, it can be a basic oil such as Manhattan fish oil or an acid such as stearic acid. The mixture of ceramic powder, solvent and any surfactants is milled for a suitable time, then plasticizers and a binder system may be added to the mix. The binders used for the tunable ceramic composites typically come from the vinyl family. However, for roll compaction processes, acrylates may be preferable. Other binders such as cellulose can also be used. Suitable plasticizers include butyl benzyl phthalate and polyalkylene glycol. This mixture may then undergo a conditioning process such as de-airation.

A simple method to quickly make a tape is to pour the slurry onto a non-stick surface such as a sheet of coated Mylar. A preferred coating is a cross-linked, UV cured silicone monomer, but other coatings such as Teflon or Aclar may be used. A doctor blade may be passed across the tape to form a thin uniform layer. The conditioned tape slurry may be pumped through a filtering mesh, and a controlled flow of slurry may be allowed into the reservoir of the tape caster. Once the slurry is in the reservoir, a carrier belt set to a specific speed or variable speed carries the slurry past a doctor blade, through a slot die or between set rollers. The flat uniform tape is formed at this stage. From the forming area, the tape may be conveyed to a drying area. For example, a drying chamber may provide warm forced air and underbed heating plates. After drying in the chamber, the tape may be rolled up and can be saved for future forming steps.

Multi-layer parts such as tunable capacitors can be produced using the tape casting method of the present invention. In contrast, it is difficult or impossible to produce such tunable structures using conventional bulk processing methods. Tapes of similar tuning materials can be combined with non-tuning materials and/or different tuning materials to produce functionally graded parts or unique properties that differ from the individual bulk parts. A preferred method of making multilayer parts is to form tapes of the individual components and then laminate the tapes in order to produce a bulk part. Such a structure would be difficult or impossible to form with bulk processing techniques.

Two-dimensional shapes other than components with square corners can be produced by a punching or cutting method in the green state of the material. This means that intricate shapes can be easily punched or cut prior to the firing step of the ceramic. After firing these shapes can be retained. Due to the flexibility of the tape cast ceramic, it can be placed in a mold such as a dome shaped cap and allowed to sinter. The fired ceramic conforms to these shapes.

Figure 3:
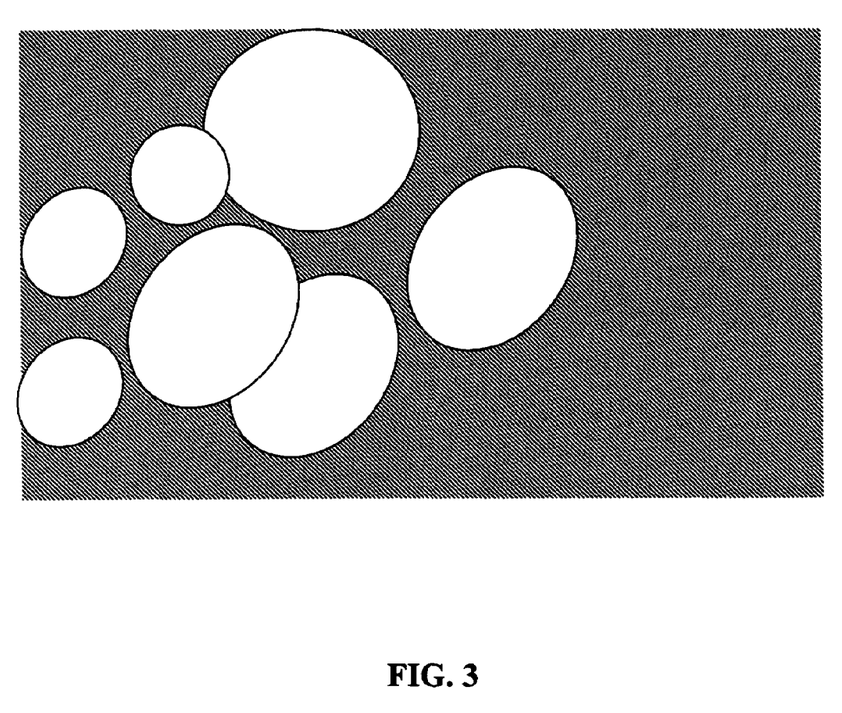
FIG. 3 is a photograph of green tape of material punched into round disks.

Forming steps, such as punching out specific shapes or cutting and slitting, can be perform in line, or as separate processing steps. For example, round disks of the green tapes may be punched out, as shown in FIG. 3. After the desired shape is cut out, steps such as via punching, calendaring and lamination can be used to form the desired component or substrate.

Figure 4:
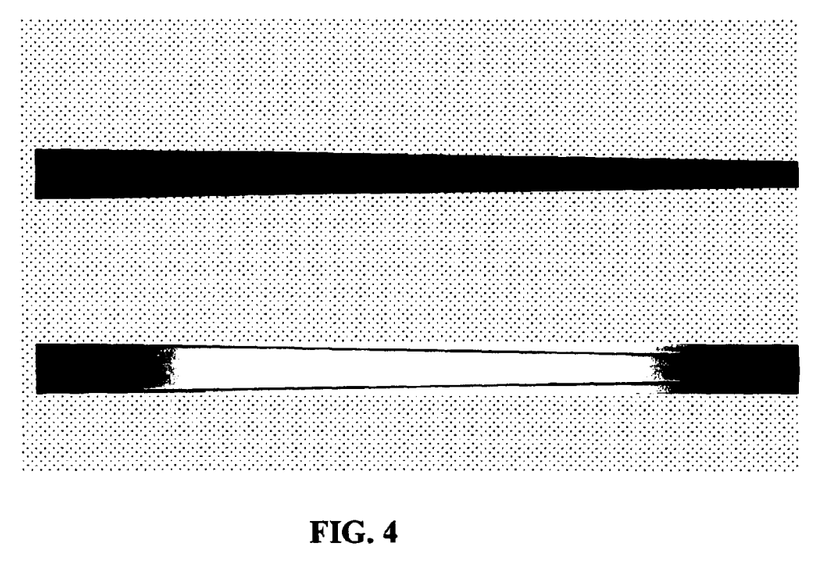
FIG. 4 is a photograph of a cross section of a laminated tape stack of green material.

It is very difficult or impossible to produce conformal shapes or multi-layer designs using conventional pressing, machining and bonding steps. On the other hand, this is relatively simple using the present tape casting method. FIG. 4 illustrates a multilayer stack of green material prior to firing. By using plasticizers, the unsintered tape is flexible and able to be easily cut. This allows for a piece of tape to be bent over a mold before firing or cut to non-conventional shapes. After sintering this shape is maintained.

In accordance with an embodiment of the present invention, a multilayer package can be made by adding metallization and interconnections to each layer independently, and then laminating the layers together. By using a tape cast piece of tunable dielectric, the component of a tunable package can be realized. This structure with tunable ceramic can then be sintered into a monolithic part. The number of layers of tunable material versus nontunable material or different tunable material can vary. By producing a multilayer structure, a material can be engineered to have very low loss properties along with tunable properties. It is also possible to produce a graded structure. An advantage of the present tape casting process for tunable ceramics is that discrete parts can be produced in a package to provide high density interconnections associated with a multilayer package combined with the tunable ceramic. Components such as discrete phase shifters in an antenna can then be placed all in a single package.

Figure 5:
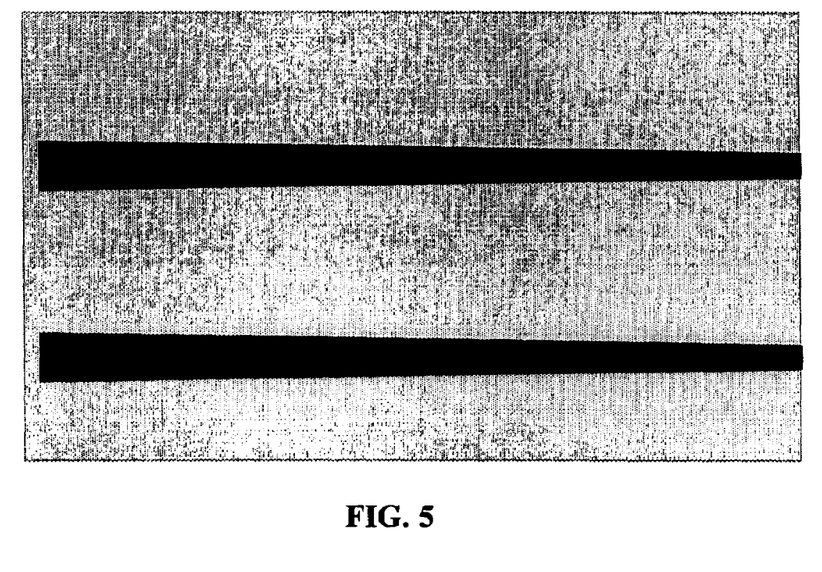
FIG. 5 is a photograph of a cross section of a sintered laminated stack of the present material.

Multi-layered tunable capacitors or multi-layered designed materials are very difficult or impossible to make using conventional bulk methods. For example, in order to use bulk tunable dielectrics to produce a structure with interdigitation, each fragile bulk substrate must be bonded together with conductive epoxy while avoiding electrical shorting. Each layer must be bonded one at a time. In accordance with the present invention, by using a laminatible binder system for the green tapes, and a screen printing technique for printing the electrodes, a stack of interdigitated parts can be made. This stack can then be pressed, for example, in a warm isostatic press after sealing in a vacuum bag. This part can then be cut to form many of these parts. These parts can then be individually fired. An example of a sintered laminated stack is illustrated in FIG. 5. This type of multilayer interdigitated system, or other types of multilayer structures, can be made with tapes of similar material or tapes of very different material.

Tape cast low temperature cofired ceramics (LTCC) may be produced in accordance with the present invention. This type of package can be made from tapes and screen printed inks. Usually, the components in this package are all fired at temperature less than 1,000° C. With glass frit additions to the tunable ceramic tapes in amounts from about 0.5–60 weight percent, typically from about 1–10 weight percent, it is possible to produce dense tunable ceramic plates made from the tape cast material. The tapes made from the tunable materials can be used as is in high temperature co-fired ceramics (HTCC) packages.

Multilayered tunable capacitors can be made using the present tape cast materials. In this case, the tape may be very thin tapes, e.g., 5 to 50 microns. Multi-layered ceramic capacitors (MLCC) may be put together in order to increase the capacitance of a capacitor while not increasing the surface area needed.

In the case of tunable capacitors, the dielectric constants may be relatively high. The multilayered structures, can be used to create very high capacitance capacitors. An added advantage would be to reduce the voltages required to obtain the amount of tuning needed. Also, these multi-layered capacitors can be tailored. The individual layers can be made with tunable materials of varied capacitances or tuning ranges to obtain ideal properties. Low loss materials can be combined with higher loss, higher tuning materials to obtain an ideal capacitor.

The following examples are intended to illustrate various aspects of the present invention and are not intended to limit the scope of the invention.

EXAMPLE 1

Powder forms of $BaTiO_3$ and $SrTiO_3$ are mixed to form the desired stoichiometry. The powders are ball-milled in either a liquid solvent, deionized water or dry mixed with ceramic grinding media for approximately 24 hours. These powders are then allowed to dry. The mixed powder is then calcined to form BSTO. The calcined powder then undergoes another mixing step with the metal silicates, oxides, titanates, zirconates, niobates, tantalates, aluminates, stannates, titanates or combination of the above list in the correct ratios to form the composite. Again this mixing is performed in either a liquid medium or dry. During mixing binders may or may not be added. This composite powder is then dried and ground to a workable particle size. At this point the powder can be made into several different forms that can be characterized as bulk, thick film, or thin film.

Manhattan fish oil is dissolved in xylene solvent and added to a jar mill filled ⅓ with cylindrical grinding media. Then a mixing solvent of ethyl alcohol and the starting tunable powders are added. The mixture is roll nixed for 24 hours. Plasticizers (phthalates and glycol) and a binder (poly vinyl butyral) are then added to the mixture, and blended for 12 hours. The slurry is de-aired in a conditioner chamber or vacuum desicator. Samples of the ratios of the components for two types of materials are as follows. These mixtures may be used to produce thick tapes, e.g., 30 to 45 mils, after drying.

Sample 1

BSTO with a oxide second phase:
1) Manhattan fish oil is weighed out and dissolved in xylene solvent.
2) After the dispersant is dissolved it is added to a 1 quart jar and alumina grinding media is added until the jar is ⅓ filled.
3) Ethanol is added to the jar as well as the composite tunable ceramic powder.
4) The powder is mixed and dispersed in the solvent mixture by roll milling at 60 rpm for 24 hours.
5) After the mixing butyl benzyl phthalate, polyalkylene glycol, and poly vinyl butyral is added and the mixture is allowed to be milled for 12 additional hours.
6) After the mixing of the binders and plasticizer is finished the mixture is de-aired in a vacuum for 8 minutes.
7) The slurry is now ready for casting.

Sample 2

BSTO with a silicate second phase:
1) Manhattan fish oil is dissolved in of xylene solvent.
2) After the dispersant is dissolved it is added to a 1 quart jar and alumina grinding media is added until the jar is ⅓ filled.
3) Ethanol is added to the jar as well the composite tunable ceramic powder.
4) The powder is mixed and dispersed in the solvent mixture by roll milling at 60 rpm for 24 hours.
5) After the mixing butyl benzyl phthalate polyalkylene glycol, and poly vinyl butyral is added and the mixture is allowed to be milled for 12 additional hours.
6) After the mixing of the binders and plasticizer is finished the mixture is de-aired in a vacuum for 8 minutes.
7) The slurry is now ready for casting.

As can be seen, differences in the second phase used requires adjustment of solvent, binder and plasticizer content in or to produce the same thickness tape with similar percentage green density and thickness. Most notable is that plastic and binder content is increased with the silicate powders.

EXAMPLE 2

A composite powder (40 wt. % Ba 0.55Sr $0.45TiO_3$+60 wt. % MgO) is combined with a commercially available tape cast binder system in a ratio that is determined based on particle size and particle surface area as shown in the following equation:

$$\text{Weight \% Ceramic} = 1/[(0.01) + \{[1.0/(18.5)(CSG)][\{100/60 - 2(CSA-3))\} - 1]\}],$$

where: CSG=Ceramic Specific Gravity (g/cc); and CSA=Ceramic Surface Area in ($m^2$/g).

The incorporation of the binder system with the powder material is performed in an attritor mill at high speeds for approximately an hour. The mixture is then ready for tape casting.

EXAMPLE 3

Roll compacted tapes are cast to a thickness of 10 mils. The tapes contained about 13 weight percent binder. The slurry is cast onto a Mylar carrier sheet coated with a cross linked, UV cured silicone monomer. Other coatings such as Teflon or Aclar may be used. A doctor blade setting of 8 mils is used. The slurry is then allowed to air dry and the ceramic sheet is cut into near net shape pieces. The coated mylar backing is then peeled from the green tape. Cofired Pt electrodes are then screen printed on the green tapes by standard screen printing techniques. The stack is then arranged in a similar manner as shown in FIG. 4. A total of 18 pieces of tapes are laminated at a temperature of 140° F. and a pressure of 1,000 psi. A finishing step of silver electrodes is printed on the surface of the stack by standard techniques. The fired stacks do not exhibit any warpage.

Roll compaction allows for decreased stresses in the material as it is being formed. The thickness can range from 2 mils to 1 inch, and both water or organic based binders can be used in this process. Another advantage is that high green densities can be achieved.

By using tape casting, tunable composites can be made with improved properties, for example, as shown in Table 1. In the following tables, the designations in the BST column, such as "55/45", indicate the weight ratio of $BaTiO_3$ to $SrTiO_3$. The second phase is mixed with the BST first phase in the weight percent listed. Any third phase is mixed with the total mixture in the weight percent shown.

TABLE 1

| BST | Material 2nd phase (MgO) | 3rd phase or other | Dielectric Constant (1 MHz) | Dielectric Loss (1 MHz) | Tunability (8 V/um) | Dielectric Constant (10 GHz) | Dielectric Loss (10 GHz) | Dielectric Constant (24 GHz) | Dielectric Loss (24 GHz) | Tc (° C.) | FOM 10 GHz | FOM 24 GHz |
|---|---|---|---|---|---|---|---|---|---|---|---|---|
| 55/45 | 60 high purity | | 95.64 | 0.00048 | 22.7 | 101.29 | 0.0068 | 92.22 | 0.0179 | −50 | 1.54 | 4.05 |
| 55/45 | 60 | | 106.5 | 0.0007 | 23.8 | 111.9 | 0.0099 | 94.25 | 0.0182 | −50 | 2.13 | 3.91 |
| A | 60 | | 130.4 | 0.0011 | 34 | 115.4 | 0.0109 | 99.34 | 0.0265 | −40 | 1.59* | 3.86* |
| 55/45 B | 60 | | 98.7 | 0.00067 | 25.8 | 102.1 | 0.0089 | 101.2 | 0.0227 | −55 | 1.75 | 4.47 |
| 55/45 | 50** | | 89.5 | 0.0008 | 21.6 | 74.3 | 0.0063 | 79.6 | 0.0152 | | 1.50 | 3.62 |
| 55/45 | 60** | | 79.82 | 0.00051 | 28.5 | 76.46 | 0.0145 | 68.86 | 0.0274 | | 2.56 | 4.84 |
| 55/45 | 60** | | 64.79 | 0.00038 | 23.4 | 46.4 | 0.0087 | 42.12 | 0.023 | | 1.90 | 5.03 |
| 60/40 | 60** | 0.05 mol % Pr$_5$O$_7$ | 77.5 | 0.001 | 17.9 | 64.6 | 0.0063 | 68.88 | 0.016 | −110 | 1.83 | 4.65 |
| 55/45 C | 60 | | 118.3 | 0.0014 | 29.5 | 106.6 | 0.0097 | 99.58 | 0.0219 | −50 | 1.65 | 3.73 |
| 50/50 D | 50** | | 127.2 | 0.001 | 42.6 | | | 108.44 | 0.0367 | −30 | | 4.13 |
| 55/45 D | 50** | | 157.3 | 0.0013 | 52.7 | | | 146.09 | 0.069 | −15 | | 6.03 |
| 30/70 | 20** | | 298.1 | 0.0013 | 11.8 | | | 288.7 | 0.00874 | −105 | | 3.92 |
| 30/70 | 40** | | 124 | 0.0011 | 11.6 | | | 102.7 | 0.0076 | −110 | | 3.47 |
| 45/55 | 50** | | 130.8 | 0.0011 | 29.7 | 125.3 | 0.0103 | 115.9 | 0.0185 | −55 | 1.74 | 3.13 |
| 45/55 | 55** | 5% MgO | 101.9 | 0.0023 | 30.22 | | | 71.47 | 0.0162 | −60 | | 2.69 |
| E | 60 | | 96.9 | 0.00075 | 20.8 | 86.23 | 0.0048 | 81.37 | 0.0138 | −70 | 1.19* | 3.42* |

*estimated tunability for 8 V/um
**2nd phase is Mg$_2$SiO$_4$ rather than MgO
A = 80% 60/40 BST mixed with 20% 50/50 TPL non-sized BST
B = 30% finer BST particles mixed with 70% coarser 219-6 BST particles
C = 20% finer BST powders mixed with 80% coarser 219-1 BST particles
D = 100% nanosized TPL BST particles
E = 80% 50/50 BST mixed with 20% 60/40 TPL nano-sized BST Tape casting in many cases can produce tunable dielectrics with enhanced properties. In some cases better tuning characteristics are achieved without sacrificing loss, as illustrated in Table 2. The second phase is mixed with first BST phase in the weight percent listed, then the third phase is mixed with the total mixture in the weight percent shown.

TABLE 2

Comparison of Properties of Bulk Materials Versus Tape Cast Materials

| BST | Material 2nd phase (MgO) | 3rd phase (MgO) | Tape cast | Dielectric Constant (1 MHz) | Loss Tangent (1 MHz) | Tunability (8 V/um) | Dielectric Constant (24 GHz) | Loss Tangent (24 GHz) |
|---|---|---|---|---|---|---|---|---|
| 55/45 | 60 | | Yes | 99.8 | 0.0011 | 22.8 | 84.6 | 0.019 |
| 55/45 | 60 | | No | 99.3 | 0.0011 | 22.1 | 83.7 | 0.018 |
| 60/40 | 40 | | Yes | 394 | 0.0014 | 48.0 | 343.37 | 0.041 |
| 60/40 | 40 | | No | 418.75 | 0.0004 | 40.64 | 350.56 | 0.035 |
| 45/55 | 50* | | Yes | 155.5 | 0.0011 | 29.2 | 138.9 | 0.021 |
| 45/55 | 50* | | No | 149.1 | 0.0011 | 30.2 | 128.9 | 0.023 |
| 45/55 | 55* | 5% | Yes | 101.9 | 0.0023 | 30.2 | 71.47 | 0.016 |
| 45/55 | 55* | 5% | No | 87.5 | 0.0016 | 19.27 | 77.57 | 0.019 |

*2nd phase is Mg$_2$SiO$_4$ rather than MgO

Table 3 lists the density of four ceramic materials made from bulk and tape casting processes. The second phase is mixed with first BST phase in the weight percent listed, then the third phase is mixed with the total mixture in the weight percentages shown.

TABLE 3

Density of Different Materials Made From Bulk and Tape Casting Methods

| Material | | | | |
|---|---|---|---|---|
| BST | 2nd phase (MgO) | 3rd phase (MgO) | Bulk Density | Tape Density |
| 55/45 | 60 | | 4.145 | 4.175 |
| 60/40 | 40 | | 3.815 | 3.909 |
| 45/55 | 50* | | 4.553 | 4.571 |
| 45/55 | 55* | 5 | 3.703 | 3.715 |

*2nd phase is $Mg_2SiO_4$ rather than MgO

Figure 6A:
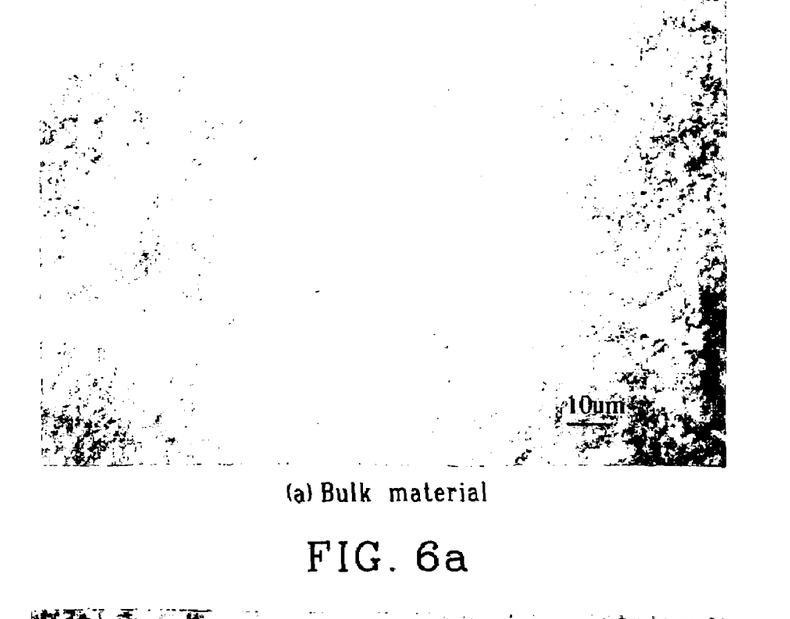
FIGS. 6a and 6b are photomicrographs of bulk material and tape cast material, respectively.
Figure 6B:
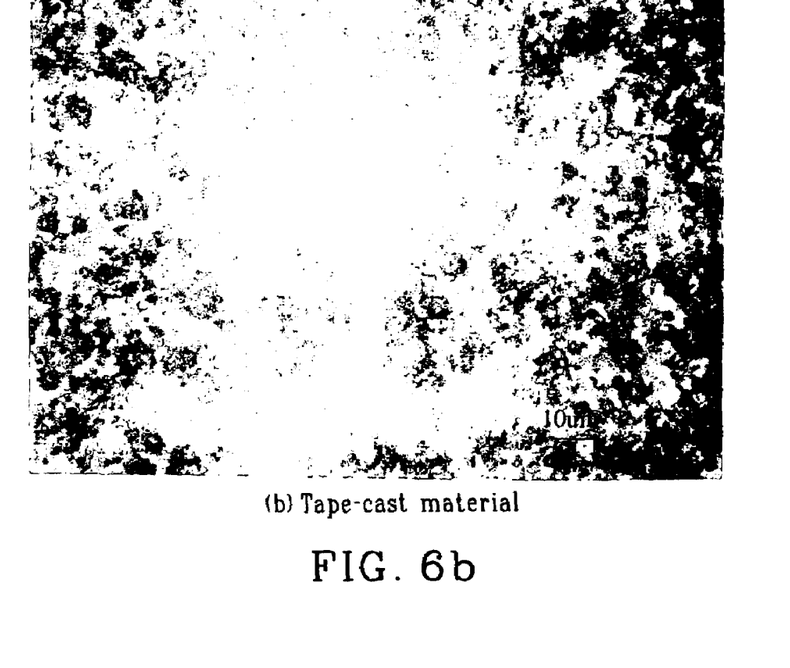

FIGS. 6a and 6b are photomicrographs of a bulk ceramic and a tape cast ceramic of the present invention, respectively. The composition of each sample is the 60/40-40 composition listed in Table 3. The tape cast material shown in FIG. 6b is more homogenous and uniform, and has smaller grains in comparison with the bulk material. The bulk sample of FIG. 6a has an average grain size of about 10 microns while the tape cast sample of FIG. 6b has an average grain size of about 5 microns. After sintering, the tape cast materials of the present invention preferably have an average grain size of less than 10 microns, more preferably less than 5 microns. In a particularly preferred embodiment, the average grain size of the tape cast ceramic material is from about 2 to about 5 microns.

Figure 7:
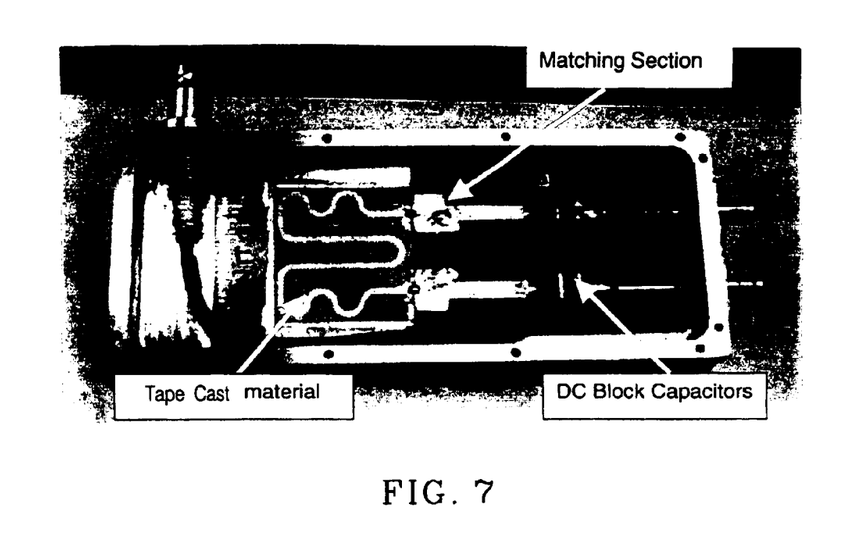
FIG. 7 illustrates a phase shifter test sample comprising a microstrip trace deposited on a tape cast tunable dielectric material of the present invention, which is deposited on a ground plane.

FIG. 7 illustrates a phase shifter incorporating a tape cast tunable dielectric in accordance with an embodiment of the present invention. The tape cast ceramic is 10 mil (0.25 mm) thick and has a composition of 60/40 listed in Table 3 with 40 weight percent MgO. The tape is positioned on a ground plane made of gold. A patterned trace made of gold having a thickness of 5 microns is deposited on the dielectric tape. The breakdown strength of the dielectric tape is tested by applying a voltage of 1,800V across the ground plane and trace. The voltage is held at 1,800V and leakage current is measured over time.

Figure 8:
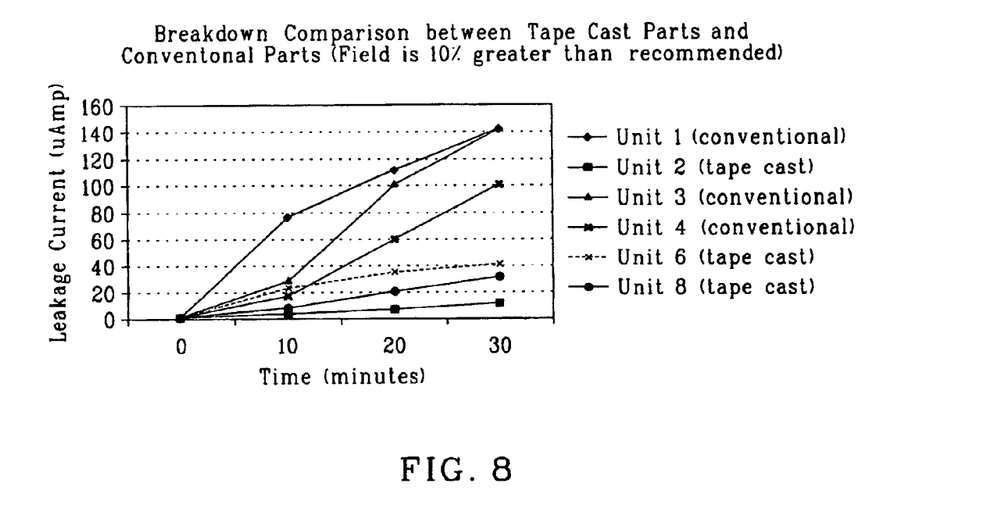
FIGS. 8 is a graph of leakage current versus time which provides a comparison of breakdown strength of the present tape cast material and conventional bulk material made from the same starting powder.

FIG. 8 contains data illustrating the better breakdown properties of tape cast ceramic. Although not intending to be bound by any particular theory, in the process of tape casting, the slurry is well mixed and homogenous, whereas with conventional powder processing methods, the powder may become segregated and agglomerated in the drying steps. As a result, the tape cast material possesses improved homogeneity and density.

The tape cast ceramic composite materials of the present invention possess improved breakdown strengths in comparison with similar compositions made by bulk processing techniques. The present ceramic composite materials preferably have improved breakdown strengths of greater than 8 V/μm, more preferably greater than 12 V/μm.

Figure 9:
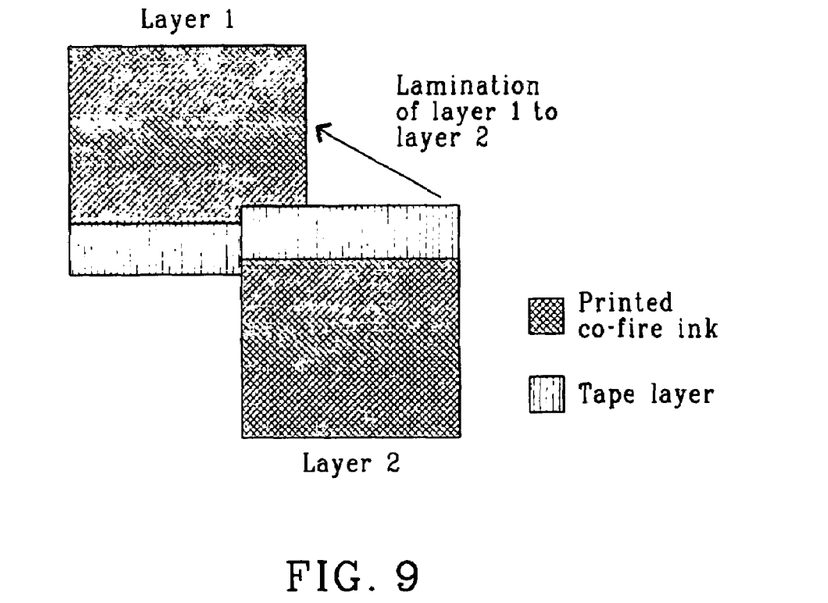
FIG. 9 is a schematic diagram of a lamination process in accordance with an embodiment of the present invention.

FIG. 9 schematically illustrates a lamination procedure in accordance with the present invention. The lamination process joins two or more layers of ceramic tape using various methods including solvent, glazing, uniaxial pressing and isostatic pressing combined with heating. Isostatic pressing may be performed at elevated temperatures. Stacked layers of ceramic tape are sealed in a plastic bag under vacuum to eliminate air between the layers and then put into an isostatic press for lamination. The lamination pressure is about 3,000–4,200 psi and the temperature is about 70° C. The holding time is about 5–15 minutes.

Some examples of the types of RF and microwave devices that can be built with the present tape materials include antennas, delay lines, high-z surface devices, co-planar waveguide phase shifters and tunable capacitors. One type of phased array antenna that may be made by the present tunable tape cast ceramic is a lens antenna. In a lens antenna, the individual lens elements may be made of individual tape cast ceramic plates. One way to decrease the voltage needed to produce the phase shift required is to make each of the plates interdigitated. A co-fired laminated tape stack was formed to achieve this effect. A stack was fabricated with 8-layer interdigitated tunable green tape. Each layer was about 0.292 mm thick. Table 4 gives the resultant tunability of the 8-layer stack as compared to a 2-layer part used in past experiments. As seen from Table 4, the required voltage is reduced to obtain approximately the same amount of tunability in the 8-layer part by approximately 4 times. This is consistent with the fact that the thickness of the layers are also reduced by approximately 4 times.

TABLE 4

Tunability Data for Bulk Layer Stack

| | |
|---|---|
| % Tunability of a 2-layer (layer thickness = 1.27 mm) part at 2,540 Volts, total field strength is 2 V/micron | 6.5 |
| % Tunability of a 8-layer (layer thickness = 0.292 mm) part at 584 Volts, total field strength is 2 V/micron | 7.33 |

Another application in which the present tape cast tunable materials may be used is a delay line phase shifter. In general, RF and microwave delay line phase shifters are used to create necessary delays in signals within a given system. Once the signal has been delayed, it can then be utilized for a variety of applications. One such application is in feed-forward power amplifiers where cancellation of the main signal is desired in order to create an error signal. In this case, input power is applied to both the main amplifier and the delay line phase shifters simultaneously. The overall electrical length of the amplifiers path dictates the amount of delay required to correctly cancel the output of the main amplifier.

Most feed-forward amplifiers are built today with coaxial cable delay line phase shifters. The cable properties must be specified to include phase stability, power handling capability, length, form factor and overall fit. Coaxial delay line phase shifters are difficult to manufacture, require tight delay tolerances, and occupy large volumes. Manual installation in the system assembly process is always a tedious procedure. Since the coaxial delay line phase shifter is cut to a predetermined length, system designers must include an additional manual variable delay line phase shifter component to absorb differences in the manufacturing process from unit-to-unit.

Tunable delay lines can be characterized as a surface mount component with good return loss, group delay, and insertion loss. Delay lines made with the present tape cast ceramics may allow the user to adjust group delay over a wide range. Phase deviations over temperature can be maintained or even modified through precise voltage control circuitry. Due to its inherent tunability, the variable delay lines remove the manufacturing issues associated with unit-to-unit variations during assembly.

The present tape cast tunable materials can also be used to fabricate microstrip delay lines for many applications. The tunable transmission delay lines are low cost, easily manufactured, and can be integrated into many system designs. In addition, the delay lines are tunable and require no exact delay requirements. This means the user can precisely adjust delay for a particular application without the need for additional hardware.

In the case of feed-forward amplifiers, all variations of delay within the path of the amplifier can be tuned out. Delay variations such as system temperature drift and aging can be completely eliminated by implementing real-time control loops around the delay lines technology.

Figure 10:
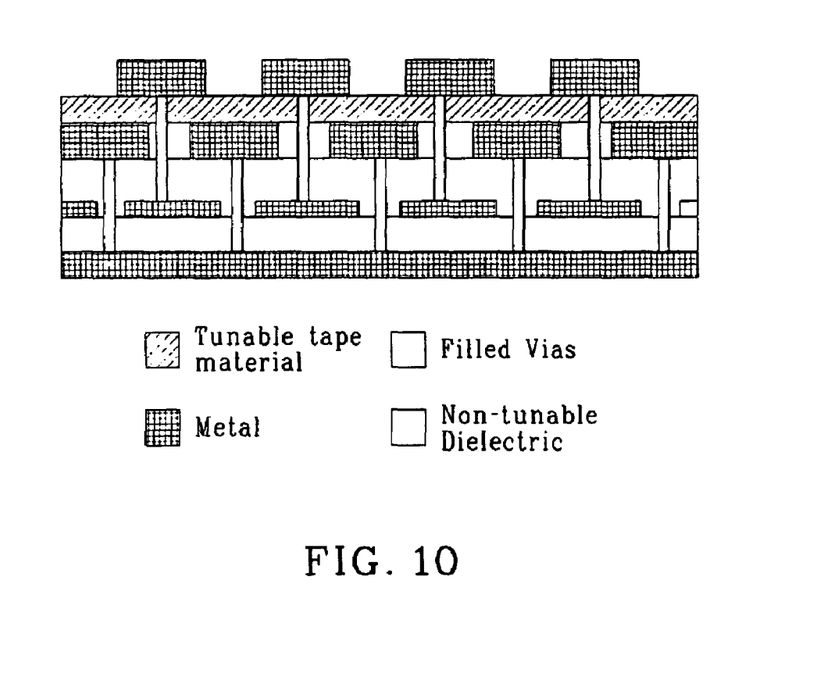
FIG. 10 is a partially schematic side sectional view illustrating a tape cast material having a high-z surface that may be used in a tunable antenna

A high-z, or high impedance, surface is basically an electromagnetic surface that has a +1 reflection coefficient, as opposed to a −1 for a typical ground plane. There is typically a band gap, or range of frequencies, where the surface has these properties. That is, a reflection phase between +Pi/2 to −Pi/2. One example of its use would be to allow very low profile antennas like a dipole without sacrificing gain. With a traditional ground plane, there can be surface waves which disrupt the pattern of an antenna. However, with a high-z surface, they do not exist within the bandgap, significantly improving the patterns of an individual element. These types of surfaces can be built using tape cast tunable ceramics, as schematically shown in FIG. 10.

The present invention provides a low cost method for making tunable dielectric composites having improved properties such as increased breakdown strengths. Advantages of the present method include: decreased processing time in comparison with conventional bulk methods of ceramic forming; decreased processing steps in comparison with conventional bulk methods of ceramic forming; achieving geometric sizes and shapes that are not realized in bulk ceramic processing; decreased costs; large scale production; wide variations of structures to be built in a simple manner; and the production of materials with enhanced properties in comparison with conventional bulk materials. The improved properties may include higher density, better homogeneity, decreased grain size, increased breakdown strengths and increased tuning.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making a layer of low-loss, tunable ceramic composite material with improved breakdown strength, the method comprising:
   tape casting a slurry comprising a mixture of at least one electronically tunable ceramic material and at least one additional ceramic material to form a tape cast layer; and
   sintering the tape cast layer, wherein the sintered tape cast layer has a breakdown strength of greater than about 8 V/micron.

2. The method of claim 1, wherein the sintered tape cast layer has a thickness of from about 0.005 to about 2 mm.

3. The method of claim 1, wherein the sintered tape cast layer has a thickness of from about 5 to about 50 microns.

4. The method of claim 1, wherein the sintered tape cast layer has a thickness of greater than about 50 microns.

5. The method of claim 1, wherein the sintered tape cast layer has an average grain size of less than about 10 microns.

6. The method of claim 1, wherein the sintered tape cast layer has an average grain size of from about 2 to about 5 microns.

7. The method of claim 1, wherein the sintered tape cast layer has a breakdown strength of greater than about 12 V/micron.

8. The method of claim 1, further comprising tape casting another layer of the slurry over at least a portion of the tape cast layer to form a laminated structure.

9. The method of claim 8, wherein the sintering step is performed after the laminated structure is formed.

10. The method of claim 1, wherein the at least one electronically tunable ceramic material comprises from about 20 to about 99 weight percent of the tape cast layer and comprises barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalite, lanthanum tantalate, barium calcium zirconium titanate and/or sodium nitrate.

11. The method of claim 1, wherein the at least one electronically tunable ceramic material comprises barium strontium titanate.

12. The method of claim 11, wherein the barium strontium titanate is of the formula $Ba_xSr_{1-x}TiO_3$, where x is from about 0.15 to about 0.6.

13. A method of making a layer of low-loss, tunable ceramic composite material with improved breakdown strength, the method comprising:
   tape casting a slurry comprising a mixture of at least one electronically tunable ceramic material and at least one additional ceramic material to form a tape cast layer; and
   sintering the tape cast layer, wherein the at least one additional ceramic material comprises from about 3 to about 65 weight percent of the tape cast layer and comprises a silicate of at least one metal selected from Be, Mg, Ca, Sr, Ba, Ra, Li, Na, K, Rb, Cs, Al, Zr, Zn, Fr, B, Fe, Mn, Cu, Ce, Cr, La, Y, Ti, Ta, Nb, Mo, W, Ni, Pd, Pb and Bi.

14. The method of claim 13, wherein the metal silicate comprises $Mg_2SiO_4$, $CaSiO_3$, $BaSiO_3$ and/or $SrSiO_3$.

15. The method of claim 1, wherein the at least one additional ceramic material comprises from about 1 to about 80 weight percent of the tape cast layer and comprises oxides of at least two metals selected from Be, Mg, Ca, Sr, Ba, Ra, Li, Na, K, Rb, Cs, Al, Zr, Zn, Fr, B, Fe, Mn, Cu, Cr, Ti, Ta, Nb, Mo, W, Ni, Pd, Pb, Bi, Si, Sn, Hf and rare earths.

16. The method of claim 15, wherein the metal oxides comprise at least two metals selected from Mg, Si, Ca, Zr, Ti and Al.

17. The method of claim 15, wherein the metal oxides are selected from $Mg_2SiO_4$, $MgO$, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, $PbO$, $Bi_2O_3$ and $La_2O_3$.

18. The method of claim 1, wherein the tape cast layer further comprises at least one low loss glass additive.

19. The method of claim 16, wherein the low loss glass additive comprises from about 0.1 to about 60 weight percent of the tape cast layer.

20. The method of claim 1, wherein the sintering is performed at a temperature of less than about 1,000° C.

* * * * *